(No Model.)

J. H. REINHARDT.
CONSECUTIVE NUMBERING MACHINE.

No. 374,629. Patented Dec. 13, 1887.

Attest:
A. N. Jesbera
S. A. Starcie

Inventor:
James H. Reinhardt
By David A. Burr
Atty.

N. PETERS, Photo-Lithographer, Washington, D. C.

UNITED STATES PATENT OFFICE.

JAMES H. REINHARDT, OF MEMPHIS, TENNESSEE, ASSIGNOR TO JOSEPH WETTER, OF SAME PLACE.

CONSECUTIVE-NUMBERING MACHINE.

SPECIFICATION forming part of Letters Patent No. 374,629, dated December 13, 1887.

Application filed August 14, 1886. Serial No. 210,872. (No model.)

*To all whom it may concern:*

Be it known that I, JAMES H. REINHARDT, of Memphis, in the county of Shelby and State of Tennessee, have invented a new and useful Improvement in Consecutive-Numbering Machines, whereby the imprint of any series of consecutive numbers may be automatically repeated as often as required; and I do hereby declare that the following is a full and exact description thereof, reference being had to the accompanying drawings, and to the letters of reference marked thereon, making a part of this specification, in which—

Figure 1:
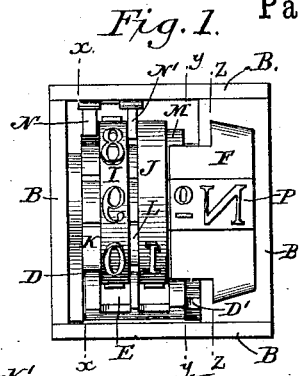
Figure 2:
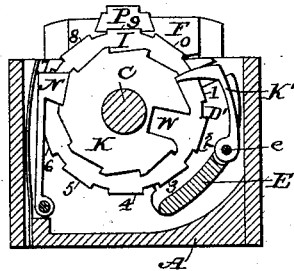
Figure 3:
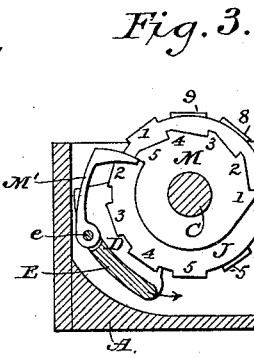
Figure 4:
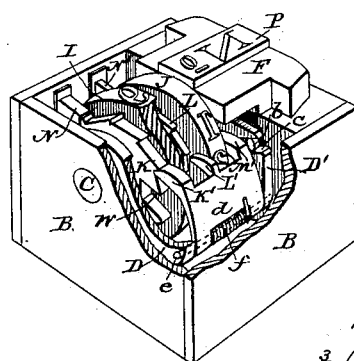
Figure 6:
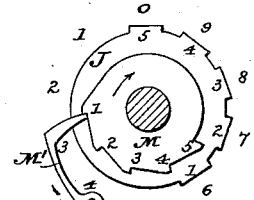
Figures 7, 9, 10:
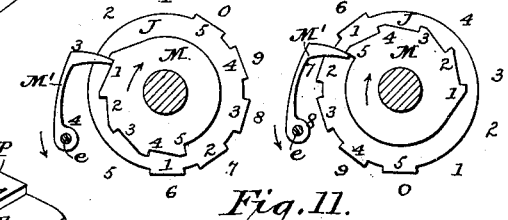
Figures 5, 8, 11:
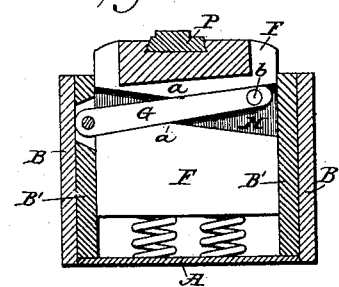

Figure 1 is a plan view of my improved serial consecutive-numbering head with the numeral 9 in line for print; Fig. 2, a vertical section in line $x$ $x$ of Fig. 1, looking toward the type-wheel; Fig. 3, a similar section in line $y$ $y$ of Fig. 1, looking from the opposite direction toward the type-wheel; Fig. 4, a perspective view of the head with its wheels in same position as in Fig. 1 and with a portion of its casing and unit-wheel broken away; Fig. 5, a similar view illustrating the wheels turned to bring the number 10 in line for print; Fig. 6, a plan view of the two type-wheels detached and in position to print the number 50, and Fig. 7 an end view or diagram of the second-wheel and pawl when in the same position as in Fig. 6; Fig. 8, a second plan view of the two type-wheels detached, illustrating them in position to print the number 1, Fig. 9 an end view or diagram of the second wheel when in the same position as in Fig. 8. Fig. 10 is an end view or diagram of the second wheel when in the position indicated in Fig. 3, the unit-wheel being in position to print the number 5, and the second wheel blank. Fig. 11 is a vertical section in line $z$ $z$ of Fig. 1, illustrating the movement of the plunger in the head; and Fig. 12, a diagram or end view of the second wheel, illustrating a modification in the combination of the two segmental ratchets therewith in which they are made to complement each other to complete a circle on one side of the wheel instead of being located each upon an opposite side of the wheel.

My invention relates to consecutive-numbering machines of the class adapted be locked up with a form of type and to be operated automatically by the movement of the platen or impression-cylinder of the press.

It has for its object to obtain automatically the constant repetition in consecutive order of a given series of numbers without stopping the press, and to render the arrangement of type more compact, and this object is obtained by the combination, with the unit-wheel common to all numbering-machines, of a second wheel bearing, peripherally, the numbers which it is desired to repeat at the left of the units, with a blank space following the highest of said numbers, this second wheel being made to turn forward by means, as hereinafter fully described, not only as is customary—one degree or figure at each complete revolution of the unit-wheel—but, so soon as the numbers thereon have all been brought into line of print and the end of the series thereby reached, move in unison with the unit-wheel until the first number in the series has been brought into position to be carried into line of print at the next move and to then remain stationary in readiness to be moved in the customary manner to said line of print as the last digit on the unit-wheel is carried away from said line.

In the accompanying drawings, A represents the base-plate, and B the outer casing, of a consecutive-numbering machine or head; C, the axial rod upon which the type-wheels rotate and the actuating-frame swings; D D', the end plates of the swinging pawl-frame, pivoted upon the rod C and united to move in unison by the cross-plate E; F, the spring-seated plunger mounted in one end of the casing parallel with the end plate, D'; G, Fig. 11, a lever pivoted at one end to a block, B', in the casing B, to extend transversely between the end plate, D', and the inner face of the plunger within a recess, H, sunk in said face, and whose upper and lower edges are inclined in opposite directions from a central point, thereby forming two opposed angles, $a$ $a$, (see Fig. 11,) which are respectively brought to bear upon the middle of the lever, so as to carry it up and down in unison with the movements of the plunger. A pin, $b$, projecting from the free end of this lever G, enters a radial slot, c, in the end plate, D', and by its engagement with said slot the reciprocating movement of the plunger is made to produce a swinging movement of the pawl-frame.

I is the unit-wheel of the head, and J its second wheel. The unit-wheel carries the customary type upon its periphery, bearing the nine digits and a cipher, and is formed with a circular concentric ratchet or ratchet-wheel, K, upon one side or face thereof, having ten teeth. The notch W, (see Fig. 2,) to be engaged by the actuating-pawl when the cipher is carried into line for print, is made much deeper than the rest. The second wheel, J, carries type representing the numbers to be imprinted at the left of the units to complete the series which it is desired to repeat—as, for example, 1 to 5, to print and repeat a series of numbers from 1 to 50. The intervals between the consecutive type on the second wheel, J, are made equal to those on the unit-wheel I, excepting the interval between the first figure, 1, and the last figure, 5, which is left wholly blank. A circular or segmental ratchet, L, of less radius than the ratchet-wheel K, is formed or secured concentrically upon the face or side of the second wheel next to the unit-wheel with as many teeth as there are type on said second wheel, and a second segmental ratchet-disk, M, is formed concentrically upon the opposite face of the same wheel, having teeth sufficient in number to cover the arc left blank between the highest and lowest numbers on said wheel, these ratchets being so located with reference to the type-figures on the wheel and the pawl which is to engage the ratchet as that the last tooth of the ratchet shall pass out of engagement with the pawl when the first of said type is within one point of the position for imprint, as illustrated in Figs. 3 and 10. The radius of the arc upon which these ratchet-teeth are formed is equal to the radius of the ratchet on the unit-wheel; but the radius of the remainder or blank portion of the disk carrying the teeth is equal to that of the recesses in the ratchet L on the inner face of the second wheel.

The pawls actuating, respectively, the three ratchets K, L, and M are made to project from a single plate, d, pivoted upon a rod, e, connecting the two pivoted end plates, D D', of the frame, said plate D being actuated by a coiled spring, f, upon said rod to throw the pawls into automatic engagement with the ratchets.

The pawls are all of the same length, and as the ratchet on the unit-wheel and the outer ratchet on the second wheel are of the same diameter, the two outer pawls, K' and M', will engage their ratchets simultaneously, while, since the diameter of the inner ratchet on the second wheel is less than that of the ratchet on the unit-wheel, its pawl L' is held out of engagement with its teeth, except at the moment when the first pawl, K', drops into the deep notch W of its ratchet, and the third pawl, M', is over the blank space or reduced diameter on its ratchet-wheel, whereupon the pawl L' will engage its ratchet and turn the second wheel one point simultaneously with the movement of the unit-wheel.

A reverse movement of the type-wheels is prevented in the customary manner by fixed spring-actuated pawls N N', arranged to bear upon the ratchets K and L on the side opposite that on which the pawls K' and L' engage the same.

A sliding plate, P, is inserted centrally in a dovetailed seat in the top of the plunger F, to move and admit of adjustment in the line to which the type on the type-wheels are brought for imprint, and the end plate, D', of the swinging frame is so cut away as to permit this type-plate to be moved over it into proximity to the unit-wheel of the head, so that an imprint of the characters on said slide may be made in close connection with that of the numbering-type on the wheels.

In the operation of this improved numbering-head the two wheels are first adjusted so that the unit-wheel shall present the number 1 to the line of print, and the second wheel the blank following the highest number (5) thereon, as shown in Figs. 8 and 9. As the plunger F is carried down by the pressure thereon of the platen of the press as it descends to obtain an impression from the type number 1 on the head, the frame D D' is made to swing upon its pivotal axis, and thereby draw the pawls K', L' and M' back over their ratchets on the type-wheels into engagement with a new tooth. So soon as the platen is lifted, and the plunger F rises under the action of its springs, the pawl K', by reason of its engagement with the ratchet K on the unit-wheel, will cause the latter to turn one point, and thereby bring the type number 2 thereon into line of print; but in the meantime, as the pawl L' is held out of engagement with its ratchet L by reason of the reduced diameter of the latter, (see Fig. 4,) or as an equivalent device by being made shorter than the pawl K', the pawl M', engaging its ratchet-disk M, will carry the second wheel forward one point, and the second wheel, J, will continue to be turned in unison with the unit-wheel I by the action of the pawl M' until said pawl has passed beyond the last tooth, 5, on the ratchet M, as shown in Fig. 10. In the meantime the unit-wheel will have turned far enough to bring the number 5 into line of print; but, the second wheel having now been brought into a position where at its next move the first number, 1, thereon will be brought into line of print, the actuating-pawl M' will thereafter play idly upon the plain surface of the ratchet-disk M, (see Figs. 3 and 10,) until, by the action of the pawl L, which occurs once at each revolution of the units-wheel, by reason of the dropping of the pawl K' into the deep notch W of the ratchet-wheel, (see Fig. 5,) the second wheel has been turned independently of the pawl M' far enough to bring the first tooth, 1, of the ratchet M once more into position to be engaged by the pawl M', as shown in said Figs. 6 and 7. As the pawl-plate $d$ now moves forward, carrying the three pawls, the first pawl, K', will move the unit-wheel I in the usual manner to turn it out from 0, Fig. 6, to 1, Fig. 8. The second pawl, L', now held out of engagement with its ratchet L, will move idly over it; but the third pawl, M', engaging the first of the five teeth on the ratchet-disk M, will cause the second wheel to move in unison with the unit-wheel from 5, Figs. 6 and 7, to blank, Figs. 8 and 9, and this synchronous movement of the two will continue during the revolution of the unit-wheel until the pawl M' has passed back of its last ratchet-tooth, 5, as shown in Figs. 3 and 10, and the type number 1 on the periphery of the wheel is in position to be brought into line for print at its next move. Henceforth the pawl M' will again be idle, having no teeth presented for its engagement until the unit-wheel has made five revolutions, and thereby moved the second wheel five consecutive points, as above described, the second wheel itself remaining idle after it has ceased to be actuated by the pawl M' until the unit-wheel has completed its full revolution and its pawl drops into the deep notch W, whereupon the pawl L', coming into play, will move the second wheel one point and bring the numeral 1 thereon into line for print, as shown in Fig. 5.

Figure 12:
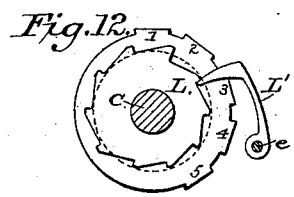

As a mechanical equivalent for the two sets of ratchets L M, one on either side of the second wheel, J, arranged to be actuated by the two pawls L' M', I contemplate the use of a single circular ratchet formed on one face only of said second wheel, this circular ratchet being divided into two equal semicircular divisions or arcs, one of which is of a greater radius than the other, as is illustrated in Fig. 12. In such case the major arc is of a radius corresponding with that of the ratchet on the unit-wheel, so that the pawl L' will engage this major half of the second ratchet-wheel simultaneously with the engagement of the first or units ratchet-wheel by the pawl K', but will move idly over the minor half, excepting at the moment the first pawl, K', drops into the deep notch W of its ratchet-wheel, as already described. This ratchet-wheel, of variable radius, is so combined with the second wheel as that its major radius shall come into position for engagement by the pawl immediately after the last or highest numeral on the periphery of the head has come into line of print, so that as soon as the units-wheel has completed its revolution the second wheel shall be turned from that point far enough to bring the first numeral thereon into position to be brought into line of print. The smaller radius of the ratchet will then come into position for engagement by the pawl, but will be engaged only as the unit-pawl drops at each full revolution into its deep notch. By this device the same result is obtained as by the use of the two pawls L' and M' and two separate ratchet wheels or disks, L and M, first above described.

I claim as my invention—

The combination, in a consecutive-numbering head, with its unit type-wheel, the pawl actuating said unit-wheel, and mechanism, substantially as described, for actuating said pawl, of a second numeral type-wheel of equal diameter bearing the left-hand figures for the numbers in the series to be repeated, and having a blank space between the highest and lowest figures thereon, a segmental ratchet affixed to said second wheel whose teeth correspond in number with the numerals on the periphery of said wheel, an auxiliary segmental ratchet whose teeth cover, at intervals corresponding to those between the ratchet-teeth of the unit-wheel, an arc complementing that of said segmental ratchet, and a pawl or pawls, substantially as described, moving in unison with the pawl of the unit-wheel and made to engage said segmental ratchets in succession, the one at each revolution of the unit-wheel and the other at each move of said wheel after the highest numeral on the second wheel has reached the line of print and until its lowest numeral has come within one move of said line, all substantially in the manner and for the purpose herein set forth.

In testimony whereof I have signed my name to this specification in the presence of two subscribing witnesses.

JAMES H. REINHARDT.

Witnesses:
WM. J. WETTER,
A. N. JESBERA.